United States Patent
Zhang et al.

(10) Patent No.: US 8,810,143 B2
(45) Date of Patent: Aug. 19, 2014

(54) DIMMER SYSTEM AND CONTROL SYSTEM AND METHOD THEREOF

(75) Inventors: Wei-Qiang Zhang, Shanghai (CN); Li-Zhi Xu, Shanghai (CN); Qi Zhang, Shanghai (CN)

(73) Assignee: Delta Electronics (Shanghai) Co., Ltd., Shanghai (CN)

( * ) Notice: Subject to any disclaimer, the term of this patent is extended or adjusted under 35 U.S.C. 154(b) by 449 days.

(21) Appl. No.: 13/237,920

(22) Filed: Sep. 20, 2011

(65) Prior Publication Data

US 2012/0320646 A1  Dec. 20, 2012

(30) Foreign Application Priority Data

Jun. 16, 2011  (CN) .......................... 2011 1 0161700

(51) Int. Cl.
  *H05B 37/02* (2006.01)
  *H05B 33/08* (2006.01)
(52) U.S. Cl.
  CPC .......... *H05B 33/0815* (2013.01); *Y02B 20/346* (2013.01)
  USPC .......... 315/224; 315/125; 315/210; 315/287; 315/291; 363/37; 363/40; 363/80
(58) Field of Classification Search
  CPC ... H05H 1/46; H05B 33/0815; H05B 33/0851
  USPC ............ 315/125, 210, 224, 287, 291; 363/40, 363/37, 80
  See application file for complete search history.

(56) References Cited

U.S. PATENT DOCUMENTS 8,264,165 B2 * 9/2012 Gu et al. ........................ 315/291
2011/0115401 A1  5/2011 Lo et al.

FOREIGN PATENT DOCUMENTS

| CN | 1520646 A | 8/2004 |
| CN | 201290191 Y | 8/2009 |
| CN | 201303444 Y | 9/2009 |
| CN | 201345755 Y | 11/2009 |
| CN | 101646289 A | 2/2010 |
| CN | 101841950 A | 9/2010 |
| CN | 201708977 U | 1/2011 |
| CN | 101971703 A | 2/2011 |
| TW | 201141302 A | 11/2011 |
| TW | 201215228 A | 4/2012 |

* cited by examiner

*Primary Examiner* — Douglas W Owens
*Assistant Examiner* — Borna Alaeddini
(74) *Attorney, Agent, or Firm* — CKC & Partners Co., Ltd.

(57) ABSTRACT

A control system includes a detection circuit, a control circuit, and a dummy load system. The detection circuit is operable to detect a voltage level change of a direct-current voltage and output an activating signal when detecting the voltage level change of the DC voltage. The control circuit is operable to receive the activating signal. The dummy load system is electrically connected to the control circuit, and the control circuit controls the dummy load system by generating a turn-on signal in response to receiving the activating signal. A dimmer system and a control method thereof are further disclosed herein.

23 Claims, 5 Drawing Sheets

DIMMER SYSTEM AND CONTROL SYSTEM AND METHOD THEREOF

RELATED APPLICATIONS

This application claims priority to Chinese Application Serial Number 201110161700.5, filed Jun. 16, 2011, which is herein incorporated by reference.

BACKGROUND

1. Field of Invention

The embodiment of the present invention relates generally to a circuit system and, more particularly, to a dimmer system.

2. Description of Related Art

In recent years, the demand for more convenient, robust and economical goods continues to rise with advancements in industry and socio-economic development. As a result, products with more economic value are being developed to meet these and other needs.

A phase dimmer is still widely used in domestic and professional lighting applications. For a lighting device such as a ballast or LED driver circuit, a dummy load is placed in a circuit to suppress oscillation occurring when a phase dimmer is turned on.

However, such a dummy load is unnecessary after the dimmer is turned on. As a result, the dummy load increases the loss and affects the power factor of the circuit, especially in a lighting application that is not installed with a phase dimmer. Therefore, a simple method is needed to control dummy load operation in order to reduce the loss and improve the power factor of a circuit.

In summary, existing apparatuses and techniques still have obvious defects and need further improvement. In order to solve the above problems, those skilled in the art are endeavoring to find a solution, but no suitable method has been proposed.

SUMMARY

A control system is provided, which addresses the problem of high power consumption and which improves the power factor.

Thus, one aspect of the embodiment of the present invention is to provide a control system. The control system comprises a detection circuit, a control circuit, and a dummy load system. The detection circuit detects a level switch of a direct-current voltage, and the detection circuit outputs an activating signal when the detection circuit detects the level switch of the direct-current voltage. The control circuit receives the activating signal. The dummy load system is electrically connected to the control circuit, and the control circuit generates a turn-on signal in response to receiving the activating signal to control the dummy load system.

In one embodiment of the present invention, the control system comprises a switch circuit and a dummy load. The switch circuit is connected with the dummy load in series. The control circuit receives the activating signal to continuously output the turn-on signal for a predetermined time, and the switch circuit receives the turn-on signal to turn on the dummy load.

In another embodiment of the present invention, the switch circuit comprises a switch element. The switch element is selected from the group consisting of a bipolar junction transistor, a metal-oxide-semiconductor field-effect transistor, and an insulated gate bipolar transistor.

In yet another embodiment of the present invention, the control system further comprises a converter. The converter comprises an input terminal and an output terminal, and the converter transforms a modulated alternating-current voltage into a direct-current voltage.

In still another embodiment of the present invention, the converter comprises a rectifier and a filter. The rectifier rectifies the modulated alternating-current voltage to generate the direct-current voltage. The filter filters the direct-current voltage.

In yet another embodiment of the present invention, the detection circuit comprises a differentiation circuit. The differentiation circuit is connected to the input terminal or the output terminal of the converter.

In still another embodiment of the present invention, the detection circuit comprises a capacitor, a first resistor, a second resistor, and a third resistor. The capacitor comprises a first terminal and a second terminal, and the first terminal of the capacitor receives the direct-current voltage. The first resistor comprises a first terminal and a second terminal. The first terminal of the first resistor is electrically connected to the second terminal of the capacitor, and the second terminal of the first resistor is connected to ground. The second resistor comprises a first terminal and a second terminal, and the first terminal of the second resistor is electrically connected to the second terminal of the capacitor. The third resistor comprises a first terminal and a second terminal. The first terminal of the third resistor is electrically connected to the second terminal of the second resistor, and the second terminal of the third resistor is connected to ground.

In yet another embodiment of the present invention, the control circuit comprises a fourth resistor, a transistor, a timer, a fifth resistor, and a sixth resistor. The fourth resistor comprises a first terminal and a second terminal, and the first terminal of the fourth resistor receives power source. The transistor comprises a control terminal, a first terminal, and a second terminal. The control terminal of the transistor is electrically connected to the first terminal of the third resistor of the detection circuit, the first terminal of the transistor is electrically connected to the second terminal of the fourth resistor, and the second terminal of the transistor is connected to ground. The timer is electrically connected to the first terminal of the transistor. The fifth resistor comprises a first terminal and a second terminal, and the first terminal of the fifth resistor is electrically connected to the timer. The sixth resistor comprises a first terminal and a second terminal. The first terminal of the sixth resistor and the second terminal of the fifth resistor are electrically connected to a first node, the first node is electrically connected to the switch circuit, and the second terminal of the sixth resistor is connected to ground.

In still another embodiment of the present invention, the control circuit comprises a digital controller, a fifth resistor, and a sixth resistor. The digital controller comprises an analog digital pin and a first pin, and the analog digital pin of the digital controller is electrically connected to the first terminal of the third resistor of the detection circuit. The fifth resistor comprises a first terminal and a second terminal, and the first terminal of the fifth resistor is electrically connected to the first pin of the digital controller. The sixth resistor comprises a first terminal and a second terminal. The first terminal of the sixth resistor and the second terminal of the fifth resistor are electrically connected to a first node, the first node is electrically connected to the switch circuit, and the second terminal of the sixth resistor is connected to ground.

In another aspect of the embodiment of the present invention, a phase dimmer system is provided. The phase dimmer system comprises a phase dimmer, a converter, and a control system. The phase dimmer modulates a phase of an alternating-current voltage to generate a modulated alternating-current voltage. The converter transforms the modulated alternating-current voltage into a direct-current voltage. The control system comprises a detection circuit, a control circuit, a dummy load system, and a switch circuit. The detection circuit detects a level switch of the direct-current voltage, and the detection circuit outputs an activating signal when the detection circuit detects the level switch of the direct-current voltage. The control circuit receives the activating signal to output a turn-on signal. The dummy load system is electrically connected to the converter in parallel, and the dummy load system comprises a switch circuit and a dummy load. The switch circuit is electrically connected with the dummy load in series, and the switch circuit receives the turn-on signal to turn on the dummy load.

In one embodiment of the present invention, the control circuit continuously outputs the turn-on signal for a predetermined time.

In another embodiment of the present invention, the control circuit stops outputting the turn-on signal when the amplitude of the activating signal outputted by the detection circuit is less than a predetermined value.

In yet another embodiment of the present invention, the phase dimmer is a forward phase dimmer, and the detection circuit outputs the activating signal when the detection circuit detects the rising edge of the direct-current voltage.

In still another embodiment of the present invention, the phase dimmer is a forward phase dimmer or a reverse phase dimmer.

In yet another embodiment of the present invention, the phase dimmer is a triode for alternating current switch or a diode for alternating current switch.

In still another embodiment of the present invention, the converter comprises a rectifier and a filter. The rectifier rectifies the modulated alternating-current voltage to generate the direct-current voltage. The filter filters the direct-current voltage.

In yet another embodiment of the present invention, the detection circuit comprises a differentiation circuit.

In still another embodiment of the present invention, the detection circuit comprises a capacitor, a first resistor, a second resistor, and a third resistor. The capacitor comprises a first terminal and a second terminal, and the first to terminal of the capacitor receives the direct-current voltage. The first resistor comprises a first terminal and a second terminal. The first terminal of the first resistor is electrically connected to the second terminal of the capacitor, and the second terminal of the first resistor is connected to ground. The second resistor comprises a first terminal and a second terminal, and the first terminal of the second resistor is electrically connected to the second terminal of the capacitor. The third resistor comprises a first terminal and a second terminal. The first terminal of the third resistor is electrically connected to the second terminal of the second resistor, and the second terminal of the third resistor is connected to ground.

In yet another embodiment of the present invention, the control circuit comprises a fourth resistor, a transistor, a timer, a fifth resistor, and a sixth resistor. The fourth resistor comprises a first terminal and a second terminal. The first terminal of the fourth resistor receives a power source. The transistor comprises a control terminal, a first terminal, and a second terminal. The control terminal of the transistor is electrically connected to the first terminal of the third resistor of the detection circuit, the first terminal of the transistor is electrically connected to the second terminal of the fourth resistor, and the second terminal of the transistor is connected to ground. The timer is electrically connected to the first terminal of the transistor. The fifth resistor comprises a first terminal and a second terminal, and the first terminal of the fifth resistor is electrically connected to the timer. The sixth resistor comprises a first terminal and a in second terminal. The first terminal of the sixth resistor and the second terminal of the fifth resistor are electrically connected to a first node, the first node is electrically connected to the switch circuit, and the second terminal of the sixth resistor is connected to ground.

In still another embodiment of the present invention, the control circuit comprises a digital controller, a fifth resistor, and a sixth resistor. The digital controller comprises an analog digital pin and a first pin, and the analog digital pin of the digital controller is electrically connected to the first terminal of the third resistor of the detection circuit. The fifth resistor comprises a first terminal and a second terminal, and the first terminal of the fifth resistor is electrically connected to the first pin of the digital controller. The sixth resistor comprises a first terminal and a second terminal. The first terminal of the sixth resistor and the second terminal of the fifth resistor are electrically connected to a first node, the first node is electrically connected to the switch circuit, and the second terminal of the sixth resistor is connected to ground.

In yet another embodiment of the present invention, the switch circuit comprises a switch element, and the switch element is selected from the group consisting of a bipolar junction transistor, a metal-oxide-semiconductor field-effect transistor, and an insulated gate bipolar transistor.

In yet another aspect of the embodiment of the present invention, a method for controlling a phase dimmer system is provided. The phase dimmer system comprises a dummy load system. The method for controlling the phase dimmer system comprises detecting a level switch of a direct-current voltage, outputting an activating signal when the level switch of the direct-current voltage is detected, outputting a turn-on signal in response to receiving the activating signal, and controlling the dummy load system according to the turn-on signal.

In one embodiment of the present invention, the method for controlling the phase dimmer system further comprises modulating a phase of an alternating-current voltage to generate a modulated alternating-current voltage, and transforming the modulated alternating-current voltage into the direct-current voltage.

In another embodiment of the present invention, the turn-on signal is continuously outputted for a predetermined time.

In yet another embodiment of the present invention, the method for controlling the phase dimmer system further comprises detecting the amplitude of the activating signal, and stopping outputting the turn-on signal when the amplitude of the activating signal is less than a predetermined value.

In summary, the embodiments of the present invention provide a control system, which addresses the problem of high power consumption and which improves the power factor.

BRIEF DESCRIPTION OF THE DRAWINGS

The invention can be more fully understood by reading the following detailed description of the embodiments, with reference made to the accompanying drawings as follows.

DETAILED DESCRIPTION

The present disclosure is more particularly described in the following examples that are intended as illustrative only since numerous modifications and variations therein will be apparent to those skilled in the art. Various embodiments of the disclosure are now described in detail. Referring to the drawings, like numbers indicate like components throughout the views. As used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. The use of examples anywhere in this specification, including examples of any terms discussed herein, is illustrative only, and in no way limits the scope and meaning of the disclosure or of any exemplified term. Likewise, the disclosure is not limited to various embodiments given in this specification.

As used herein, "around," "about" or "approximately" shall generally mean within 20 percent, preferably within 10 percent, and more preferably within 5 percent of a given value or range. Numerical quantities given herein are approximate, meaning that the term "around," "about" or "approximately" can be inferred if not expressly stated.

As used herein, the terms "comprising," "including," "having," "containing," "involving," and the like are to be understood to be open-ended, i.e., to mean including but not limited to.

Figure 1:
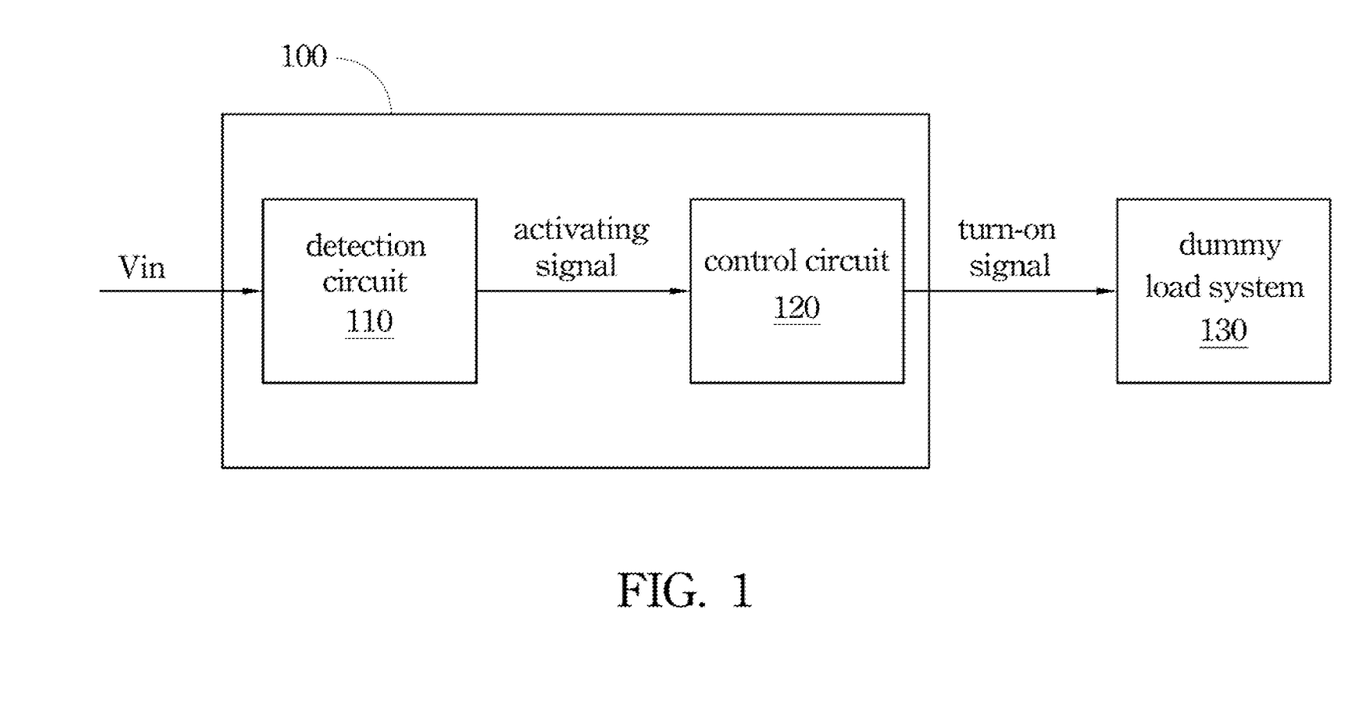
FIG. 1 schematically shows a circuit block diagram of a control system and a dummy load system according to embodiments of the present invention.

FIG. 1 schematically shows a circuit block diagram of a control system 100 and a dummy load system 130 according to embodiments of the present invention.

As shown in FIG. 1, the control system 100 comprises a detection circuit 110, a control circuit 120, and a dummy load system 130. The detection circuit 110 detects a level switch of a direct-current voltage. For example, the detection circuit 110 detects the point at which there has been a switch in the level of the direct-current voltage from a low level to a high level. The detection circuit 110 outputs an activating signal when detecting such a level switch point of the direct-current voltage. The control circuit 120 then receives the activating signal. The dummy load system 130 is electrically connected to the control circuit 120, and the control circuit 120 generates a turn-on signal in response to receiving the activating signal to control the dummy load system 130.

Figure 2:
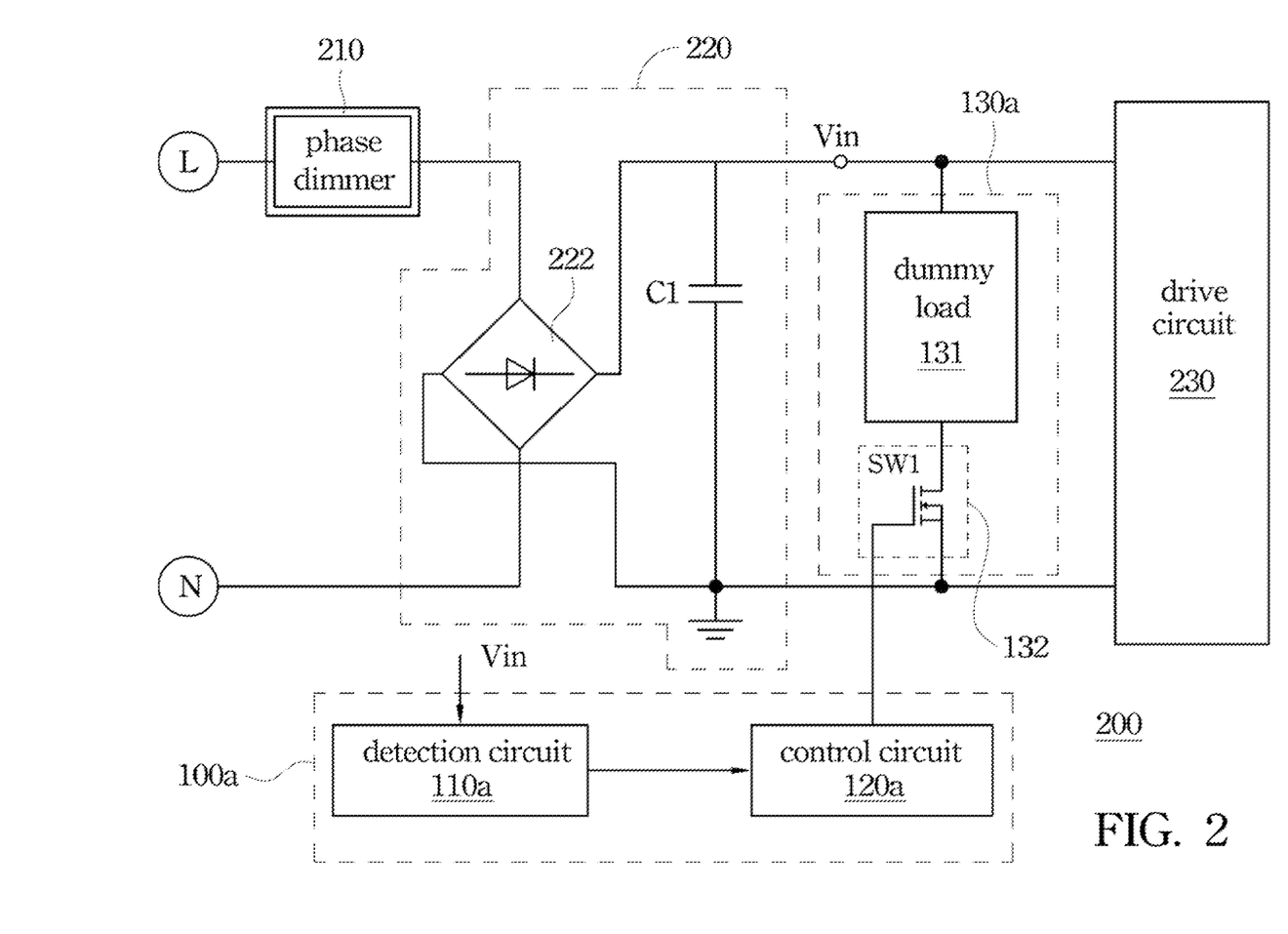
FIG. 2 schematically shows a circuit diagram of a phase dimmer system according to embodiments of the present invention.

Hence, the control system 100 of the embodiment of the present invention can use the detection circuit 110 to detect a level switch of a direct-current voltage generated by a phase dimmer 210 as shown in FIG. 2 when the phase dimmer 210 is turned on, and the control circuit 120 generates the turn-on signal for turning on the dummy load system 130 to restrain the oscillation generated by the phase dimmer 210. The dummy load system 130 can be an electrical load for simulating a load in a circuit system, for example, a power resistor, and the dummy load system 130 is used to restrain the oscillation generated by the switching operation of the phase dimmer 210.

In one embodiment, the dummy load system 130 comprises a switch circuit 132 (for example, a switch element SW1 as shown in FIG. 2) and a dummy load 131, and the switch circuit 132 is connected with the dummy load 131 in series. The control circuit 120 receives the activating signal to continuously output the turn-on signal for a predetermined time, and the switch circuit 132 receives the turn-on signal to turn on the dummy load 131.

As described above, the control circuit 120 does not output the turn-on signal after the predetermined time so that the dummy load system 130 will be turned off. Therefore, unnecessary power consumption is avoided, and the power factor of the circuit will not be affected.

The switch element can be a semiconductor transistor, for example, a bipolar junction transistor, a metal-oxide-semiconductor field-effect transistor, or an insulated gate bipolar transistor; however, these are not intended to limit the present invention, and those skilled in the art can select an appropriate element for use as the switch element according to actual requirements without departing from the spirit or scope of the present invention.

It is noted that the predetermined time can be set based on actual requirements. For example, the predetermined time can be half of the period of a phase dimmer system 200 shown in FIG. 2, a quarter of the period of the phase dimmer system 200, and so on. However, these are not intended to limit the present invention, and those skilled in the art can, without departing from the spirit or scope of the present invention, selectively adopt different time periods to make the control circuit 120 output the turn-on signal for the predetermined time and thereby control the dummy load system 130 to turn on for an appropriate time according to actual requirements.

In one embodiment, the range of the oscillation generated by the switch operation of the phase dimmer 210 can be detected to discontinue output of the turn-on signal by the control circuit 120. In such an embodiment, output of the turn-on signal by the control circuit 120 is discontinued when the range of the oscillation generated by the switch operation of the phase dimmer 210 is less than a predetermined value.

FIG. 2 schematically shows a circuit diagram of a phase dimmer system 200 according to embodiments of the present invention. The phase dimmer system 200 comprises a phase dimmer 210, a converter 220, a control system 100a, and a dummy load system 130a. The phase dimmer 210 modulates the phase of an alternating-current voltage to generate a modulated alternating-current voltage. The converter 220 transforms the modulated alternating-current voltage into a direct-current voltage Vin, for example, a half-wave direct-current voltage.

In addition, the control system 100a comprises a detection circuit 110a and a control circuit 120a. The dummy load system 130a comprises a dummy load 131 and a switch circuit 132. The dummy load 131 and the switch circuit 132 are connected with the output terminal of the converter 220 in series. The switch circuit 132 comprises a switch element SW1. The detection circuit 110a detects the level switch of the direct-current voltage. That is to say, the detection circuit 110a can detect a level switch point of the direct-current voltage Vin from a low level to a high level (i.e., the rising edge of the direct-current voltage) or from a high level to a low level (i.e., the falling edge of the direct-current voltage).

Moreover, the detection circuit 110a can detect the input voltage of the converter 220. That is to say, the detection circuit 110a can detect the level switch of the alternating-current voltage. The detection circuit 110a can further comprise a rectifier circuit, and the level switch point from a low level to a high level or a high level to a low level can be used to control the switch circuit 132 when the detection circuit 110a detects the input voltage of the converter 220. The input voltage of the converter 220 is an alternating-current voltage.

The detection circuit 110a outputs an activating signal when the detection circuit 110a detects the level switch of the direct-current voltage Vin. The control circuit 120a receives the activating signal to continuously output a turn-on signal for a predetermined time. The dummy load system 130a is connected with the converter 220 in parallel, and within the dummy load system 130a, the switch circuit 132 is connected with the dummy load 131 in series. The switch circuit 132 receives the turn-on signal to turn on the dummy load 131. Furthermore, a drive circuit 230 is electrically connected to the converter 220, and the drive circuit 230 drives a lighting device.

In another embodiment, the control circuit 120a stops outputting the turn-on signal when the amplitude of the activating signal outputted by the detection circuit 110a is less a predetermined value.

As mentioned above, the detection circuit 110a can detect the level switch of the direct-current voltage Vin when the phase dimmer 210 is turned on to make the control circuit 120a output the turn-on signal for the predetermined time. The turn-on signal controls the dummy load system 130a to turn on so as to restrain the oscillation generated by the phase dimmer 210. The control circuit 120a receives the activating signal to continuously output the turn-on signal for the predetermined time, and the switch circuit 132 receives the turn-on signal to turn on the dummy load 131a. Furthermore, the control circuit 120a stops outputting the turn-on signal when the amplitude of the activating signal outputted by the detection circuit 110a is less than the predetermined value, such that the dummy load system 130a is also turned off. Therefore, unnecessary power consumption is avoided, and the power factor of the circuit will not be affected.

The phase dimmer 210 is a forward phase dimmer or a reverse phase dimmer. If the phase dimmer 210 is a forward phase dimmer, the detection circuit 110a outputs the activating signal when the detection circuit 110a detects the rising edge of the direct-current voltage Vin.

The phase dimmer 210 can be a Triac (Triode for Alternating Current) or a Diac (Diode for Alternating Current); however, these are not intended to limit the present invention, and those skilled in the art can select an appropriate element for use as the phase dimmer 210 according to actual requirements without departing from the spirit or scope of the present invention.

In one embodiment, the converter 220 comprises a rectifier 222 and a filter (for example, a filter capacitor C1). The rectifier 222 rectifies the modulated alternating-current voltage to generate the direct-current voltage. The filter filters the direct-current voltage.

In an optional embodiment, the detection circuit 110a can be a differentiation circuit. The differentiation circuit detects a level switch of a voltage, and the level switch of the voltage is a phase cut operation of the phase dimmer 210. However, these are not intended to limit the present invention, and those skilled in the art can select an appropriate circuit for use as the detection circuit 110a according to actual requirements without departing from the spirit or scope of the present invention.

Figure 3:
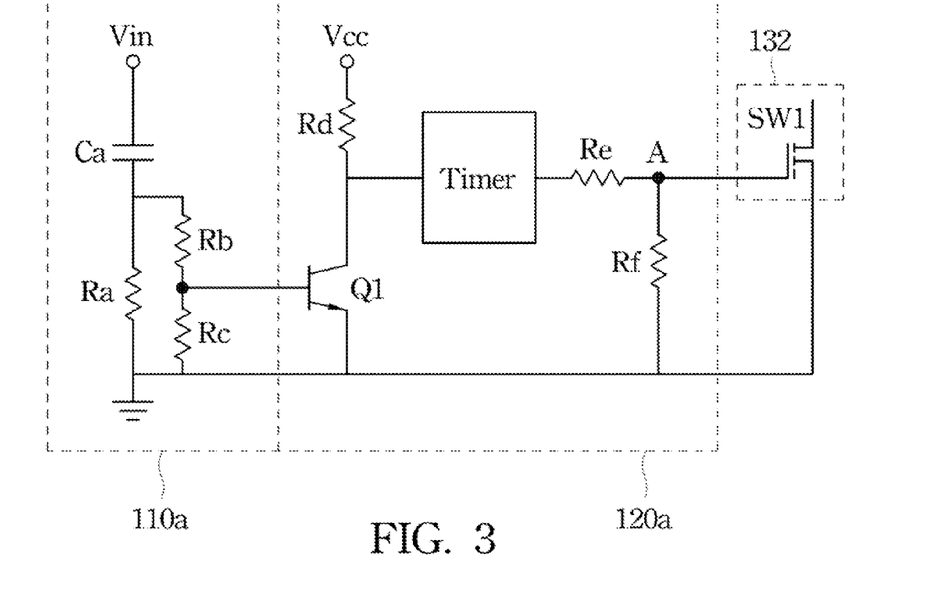
FIG. 3 schematically shows a circuit diagram of a detection circuit and a control circuit according to embodiments of the present invention.

FIG. 3 schematically shows a circuit diagram of a detection circuit 110a and a control circuit 120a according to embodiments of the present invention.

As shown in FIG. 3, the detection circuit 110a comprises a capacitor Ca, a first resistor Ra, a second resistor Rb, and a third resistor Rc. The capacitor Ca comprises a first terminal and a second terminal, and the first terminal of the capacitor receives a direct-current voltage Vin. The first resistor Ra comprises a first terminal and a second terminal. The first terminal of the first resistor Ra is electrically connected to the second terminal of the capacitor Ca and the second terminal of the first resistor Ra is connected to ground. The second resistor Rb comprises a first terminal and a second terminal, and the first terminal of the second resistor Rb is electrically connected to the second terminal of the capacitor Ca. The third resistor Rc comprises a first terminal and a second terminal. The first terminal of the third resistor Rc is electrically connected to the second terminal of the second resistor Rb and the second terminal of the third resistor Rc is connected to ground.

In addition, the control circuit 120a can comprise a fourth resistor Rd, a transistor Q1, a timer (for example, a 555 timer), a fifth resistor Re, and a sixth resistor Rf. The fourth resistor Rd comprises a first terminal and a second terminal, and the first terminal of the fourth resistor Rd receives a power source Vcc. The transistor Q1 comprises a control terminal, a first terminal, and a second terminal. The control terminal of the transistor Q1 is electrically connected to the first terminal of the third resistor Rc of the detection circuit 110a, the first terminal of the transistor Q1 is electrically connected to the second terminal of the fourth resistor Rd, and the second terminal of the transistor Q1 is connected to ground. The timer is electrically connected to the first terminal of the transistor Q1. The fifth resistor Re comprises a first terminal and a second terminal, and the first terminal of the fifth resistor Re is electrically connected to the timer. The sixth resistor Rf comprises a first terminal and a second terminal. The first terminal of the sixth resistor Rf and the second terminal of the fifth resistor Re are electrically connected to a first node A. The first node A is electrically connected to the switch element SW1 of the switch circuit 132. The second terminal of the sixth resistor Rf is connected to ground. The capacitor Ca is a differentiation capacitor, which is used to detect a level switch signal. The direct-current voltage Vin is divided by the second resistor Rb and the third resistor Rc, and the transistor Q1 is turned on to activate the timer. The timer outputs a control signal, and the control signal is divided by the fifth resistor Re and the sixth resistor Rf to become a turn-on signal for turning on the switch element SW1 of the switch circuit 132. The timer can set a predetermined time to output the control signal according to actual requirements.

Figure 4:
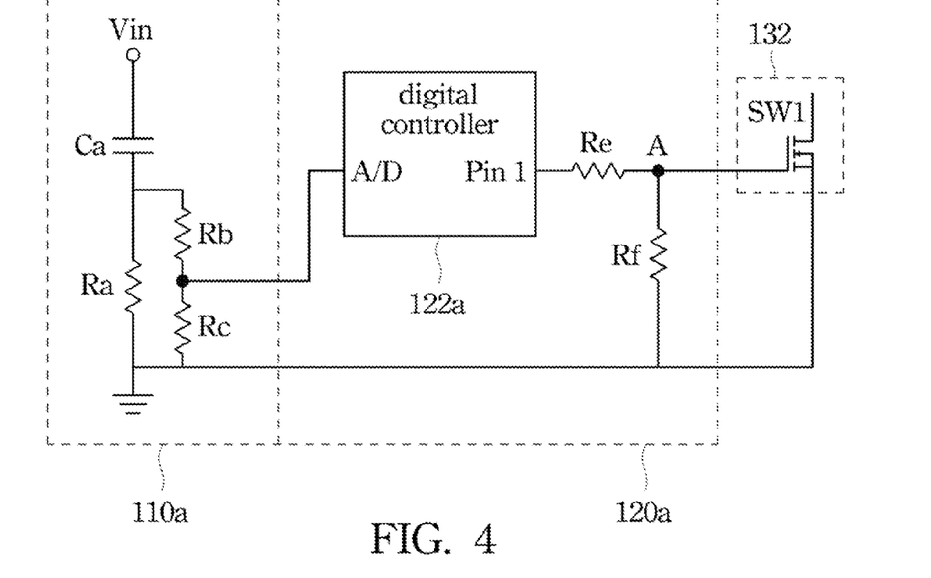
FIG. 4 schematically shows a circuit diagram of a detection circuit and a control circuit according to embodiments of the present invention.

FIG. 4 schematically shows a circuit diagram of a detection circuit 110a and a control circuit 120a according to embodiments of the present invention.

It is noted that the detection circuit 110a in FIG. 4 is similar to the detection circuit 110a in FIG. 3, and so an explanation of the detection circuit 110a will not be repeated for the sake of brevity. The control circuit 120a can comprise a digital controller 122a, a fifth resistor Re, and a sixth resistor Rf. The digital controller 122a comprises an analog digital pin ND and a first pin Pint, and the analog digital pin A/D of the digital controller 122a is electrically connected to the first terminal of the third resistor Rc of the detection circuit 110a. The fifth resistor Re comprises a first terminal and a second terminal, and the first terminal of the fifth resistor Re is electrically connected to the first pin Pin1 of the digital controller 122a. The sixth resistor Rf comprises a first terminal and a second terminal. The first terminal of the sixth resistor Rf and the second terminal of the fifth resistor Re are electrically connected to a first node A. The first node A is electrically connected to the switch circuit SW1, and the second terminal of the sixth resistor Rf is connected to ground. The digital controller 122a functions similar to a timer. The level switch signal is divided by the second resistor Rb and the third resistor Rc, and the divided level switch signal accesses the digital pin ND of the digital controller 122a. Next, the control signal outputted from the first pin Pin1 of the digital controller 122a is divided by the fifth resistor Re and the sixth resistor Rf to become a turn-on signal for turning on the switch element SW1 of the switch circuit 132. The digital controller 122a can set a predetermined time to output the control signal. The digital controller 122a can also determine whether to discontinue output of the turn-on signal in response to receipt of the activating signal by the digital controller 122a. For example, the digital controller 122a discontinues output of the turn-on signal when the activating signal the digital controller 122a receives is less than a predetermined value.

Figure 5A:
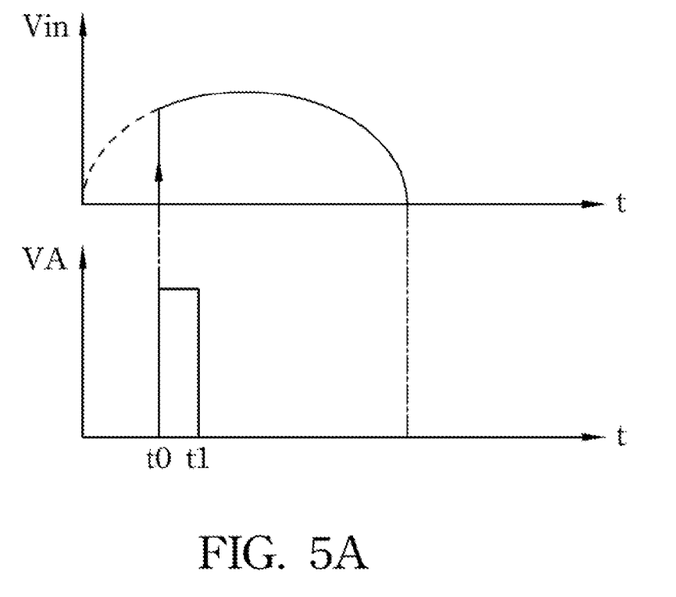
FIG. 5A schematically shows a waveform diagram of a phase dimmer when the phase dimmer is turned on according to embodiments of the present invention, in which the phase dimmer may be used in the phase dimmer system of FIG. 2.
Figure 5B:
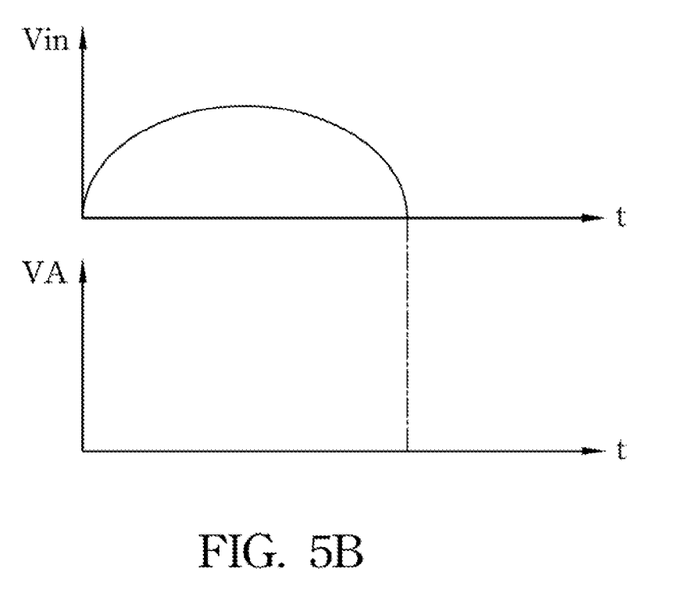
FIG. 5B schematically shows a waveform diagram of a phase dimmer when the phase dimmer is turned off according to embodiments of the present invention, in which the phase dimmer may be used in the phase dimmer system of FIG. 2.

FIG. 5A schematically shows a waveform diagram of a phase dimmer 210 when the phase dimmer 210 is turned on according to embodiments of the present invention, in which the phase dimmer 210 may be used in the phase dimmer system 200 of FIG. 2. FIG. 5B schematically shows a waveform diagram of the phase dimmer 210 when the phase dimmer 210 is turned off according to embodiments of the present invention, in which the phase dimmer 210 may be used in the phase dimmer system 200 of FIG. 2. Referring to FIG. 2, FIG. 3, FIG. 5A, and FIG. 5B, when the phase dimmer 210 is turned on, the voltage level of Vin is switched at t0 as shown in FIG. 5A, which is the so-called rising edge where the voltage level is transformed from a low level into a high level. A first bias voltage is generated when the detection circuit 110a detects the level switch, that is to say, when the detection circuit 110a detects the rising edge. The transistor Q1 of the control circuit 120a will be turned on by the first bias voltage.

At this time, a second bias voltage is generated from the first terminal of the transistor Q1, and the timer continuously outputs the turn-on signal for a predetermined time when the timer receives the second bias voltage; meanwhile, the control circuit 120a generates a pulse through the first node A during a time period from t0 to t1 as shown in FIG. 5A, and the dummy load system 130a is correspondingly turned on during the time period from t0 to t1. As mentioned above, the detection circuit 110a of the control system 100a in the present invention embodiment can be used to detect the level switch of the direct-current voltage when the phase dimmer 210 is turned on, and the control circuit 120a outputs the turn-on signal for the predetermined time to turn on the dummy load system 130a so as to restrain the oscillation generated by the phase dimmer 210. The control circuit 120a receives the activating signal to continuously output the turn-on signal for the predetermined time, and the switch circuit 132 receives the turn-on signal to turn on the dummy load 131a.

In contrast, the level of Vin as shown in FIG. 5B will not be switched when the phase dimmer 210 is turned off. The detection circuit 110a at this time will not detect a level switch, and as a result, the control circuit 120a will not correspondingly generate the turn-on signal. At the same time, a pulse will not be generated from the first node A, as shown in FIG. 5B, and the dummy load system 130a maintains the turn off state. As described above, the dummy load system 130a will be kept in an off state when the phase dimmer 210 is turned off, and therefore, unnecessary power consumption is avoided, and the power factor of the circuit will not be affected.

Reference is now made to both FIG. 2 and FIG. 4. The level of Vin is switched at t0 as shown in FIG. 5A when the phase dimmer 210 is turned on, which is the so-called rising edge where the voltage level is transformed from a low level into a high level. The voltage between the two terminals of the third resistor Rc of the detection circuit 110a will be detected by the control circuit 120a through the analog digital pin A/D of the digital controller 122a when the detection circuit 110a detects the level switch. Next, the digital controller 122a continuously outputs the turn-on signal for the predetermined time in response to the voltage between the two terminals of the third resistor Rc. At the same time, the control circuit 120a generates a pulse through the first node A during a is time period from t0 to t1 as shown in FIG. 5A, and the dummy load system 130a is correspondingly turned on during the time period from t0 to t1.

As mentioned above, the detection circuit 110a of the control system 100a in the embodiment of the present invention can be used to detect the level switch of the direct-current voltage when the phase dimmer 210 is turned on, and the control circuit 120a outputs the turn-on signal for the predetermined time to turn on the dummy load system 130a. As a result, the oscillation generated by the phase dimmer 210 is restrained. The control circuit 120a receives the activating signal to continuously output a turn-on signal for a predetermined time, and the switch circuit 132 receives the turn-on signal to turn on the dummy load 131a.

In contrast, the level of Vin as shown in FIG. 5B will not be switched when the phase dimmer 210 is turned off. The detection circuit 110a at this time will not detect a level switch, and as a result, the control circuit 120a will not correspondingly generate the turn-on signal. At the same time, a pulse will not be generated from the first node A, as shown in FIG. 5B, and the dummy load system 130a maintains the turn off state. As described above, the dummy load system 130a will be kept in an off state when the phase dimmer 210 is turned off, and therefore, unnecessary power consumption is avoided, and the power factor of the circuit will not be affected.

Figure 6:
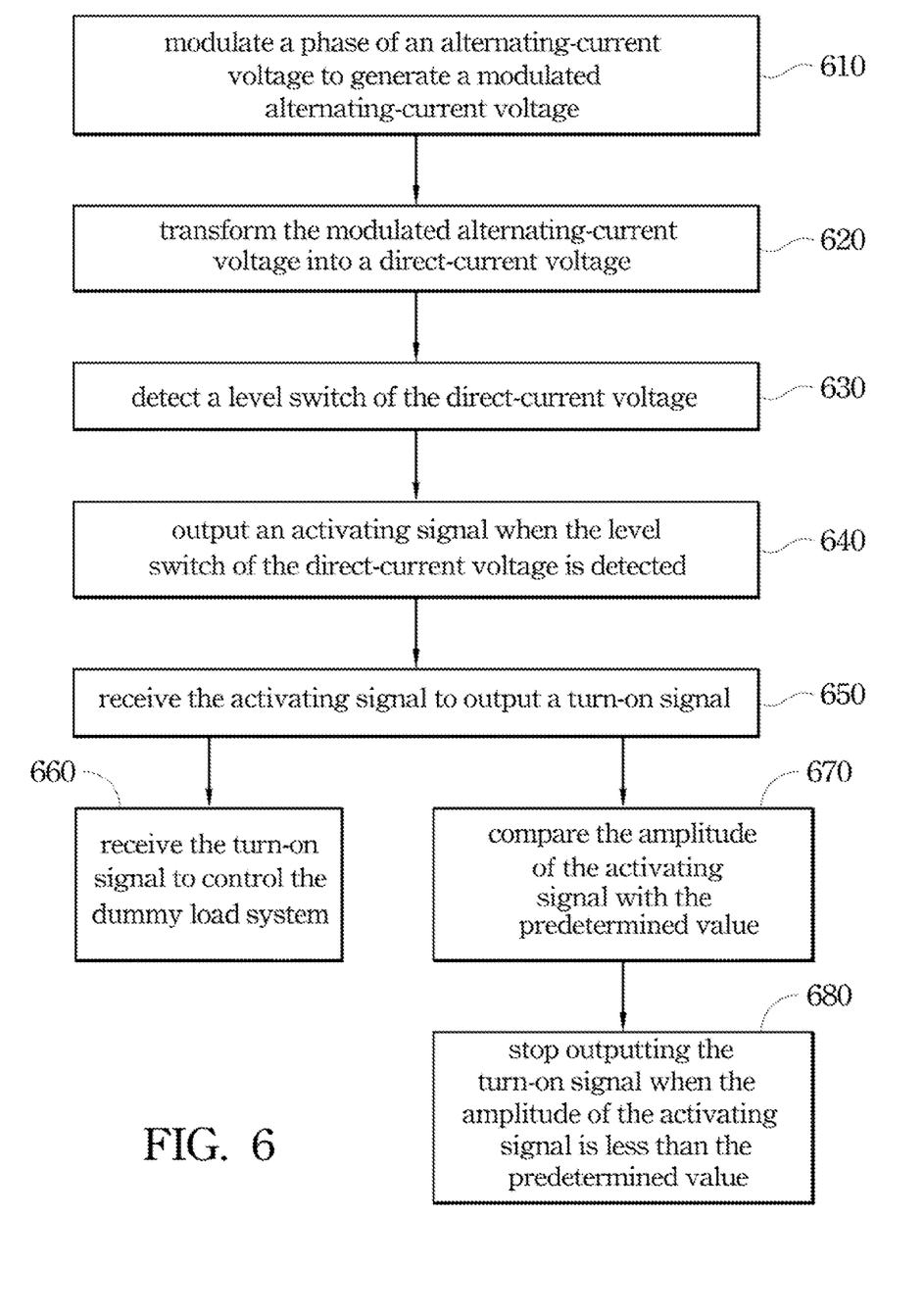
FIG. 6 schematically shows a flow diagram of a method for controlling a phase dimmer system according to embodiments of the present invention.

FIG. 6 schematically shows a flow diagram of a method for controlling a phase dimmer system according to embodiments of the present invention. The phase dimmer system can comprise a dummy load system. As shown in FIG. 6, the method for controlling a phase dimmer system comprises modulating a phase of an alternating-current voltage to generate a modulated alternating-current voltage (step 610), transforming the modulated alternating-current voltage into a direct-current voltage (step 620), detecting a level switch of the direct-current voltage (step 630), outputting an activating signal when the level switch of the direct-current voltage is detected (step 640), receiving the activating signal to output a turn-on signal (step 650), and receiving the turn-on signal to control the dummy load system (step 660).

It is noted that the method for controlling a phase dimmer system can be implemented by the dummy load system 130*a* of the phase dimmer system 200 as shown in FIG. 2. However, such an implementation is not intended to limit the present invention, and the method for controlling a phase dimmer system is described with reference to the embodiment of the present invention as shown in FIG. 2 merely for illustrative purposes.

The method for controlling a phase dimmer system is described in greater detail with reference to FIG. 2 and FIG. 6. The method for controlling a phase dimmer system according to embodiments of the present invention comprises detecting the level switch of the direct-current voltage to output the activating signal when the phase dimmer 210 is turned on. Subsequently, the turn-on signal is generated in response to receiving the activating signal to control the dummy load system 130*a*. As described above, the dummy load system 130*a* can be correspondingly turned on when the phase dimmer 210 is turned on to restrain the oscillation generated by the phase dimmer 210.

Specifically, in step 610, the phase dimmer 210 can be implemented to modulate the phase of the alternating-current voltage so as to generate the modulated alternating-current voltage. In step 620, the converter 220 can be implemented to transform the modulated alternating-current voltage into a direct-current voltage.

In steps 630 and 640, the detection circuit 110*a* of the control system 100*a* can be implemented to detect the level switch of the direct-current voltage, and the detection circuit 110*a* outputs the activating signal when the detection circuit 110*a* detects the level switch of the direct-current voltage.

Next, in step 650, the control circuit 120*a* of the control system 100*a* can be implemented to receive the activating signal to output the turn-on signal. The switch circuit 132 of the dummy load system 130*a* can turn on the dummy load 131 according to the turn-on signal. Thus, the dummy load system 130*a* can be controlled according to the turn-on signal (step 660).

In one embodiment, the turn-on signal is continuously outputted for a predetermined time, and the turn-on signal is not outputted after the predetermined time so that the dummy load system 130*a* as shown in FIG. 2 is turned off. Therefore, unnecessary power consumption is avoided, and the power factor of the circuit will not be affected.

In addition, in step 670, the control circuit 120*a* can be implemented to compare the amplitude of the activating signal with the predetermined value, and the control circuit 120*a* stops outputting the turn-on signal when the amplitude of the activating signal is less than the predetermined value (step 680). Thus, the control circuit 120*a* stops outputting the turn-on signal when the amplitude of the activating signal is less the predetermined value. As a result, the dummy load system 130*a* as shown in FIG. 2 is turned off, and therefore, unnecessary power consumption is avoided, and the power factor of the circuit will not be affected.

Those having skill in the art will appreciate that the method for controlling the phase dimmer system can be performed with software, hardware, and/or firmware. For example, if a designer determines that speed and accuracy are paramount, the designer may opt for a mainly hardware and/or firmware implementation; alternatively, if flexibility is paramount, the designer may opt for a mainly software implementation; or, yet again alternatively, the designer may opt for some combination of hardware, software, and/or firmware. Those skilled in the art will recognize that optical aspects of implementations will typically employ optically oriented hardware, software, and or firmware.

In addition, those skilled in the art will appreciate that aspects of each of the steps of the method for controlling a phase dimmer system described after the naming of the main function of each of the steps are merely used to describe the technology in the embodiment of the present invention in detail but should not be limited thereto. Therefore, combining the steps of said method into one step, dividing the steps into several steps, or rearranging the order of the steps is within the scope of the embodiment in the present invention.

In view of the foregoing embodiments of the present invention, many advantages of the present invention are now apparent. The embodiment of the present invention provides the control system 100, 100*a*. The control system 100, 100*a* turns on the dummy load system 130, 130*a* for a predetermined time when the phase dimmer 210 is turned on to restrain the oscillation generated by the phase dimmer 210. The dummy load system 130, 130*a* is subsequently turned off so as to avoid unnecessary power consumption and improve the power factor.

It will be understood that the above description of embodiments is given by way of example only and that various modifications may be made by those with ordinary skill in the art. The above specification, examples and data provide a complete description of the structure and use of exemplary embodiments of the invention. Although various embodiments of the invention have been described icy above with a certain degree of particularity, or with reference to one or more individual embodiments, those with ordinary skill in the art could make numerous alterations to the disclosed, embodiments without departing from the spirit or scope of this invention, and the scope thereof is determined by the claims that follow.

What is claimed is:

1. A control system, comprising:
 a detection circuit for detecting a level switch of a direct-current voltage, the detection circuit outputting an activating signal when the detection circuit detects the level switch of the direct-current voltage, wherein the detection circuit comprises:
  a capacitor comprising a first terminal and a second terminal, wherein the first terminal of the capacitor receives the direct-current voltage;
  a first resistor comprising a first terminal and a second terminal, wherein the first terminal of the first resistor is electrically connected to the second terminal of the capacitor, and the second terminal of the first resistor is connected to ground:
  a second resistor comprising a first terminal and a second terminal, wherein the first terminal of the second resistor is electrically connected to the second terminal of the capacitor; and
  a third resistor comprising a first terminal and a second terminal, wherein the first terminal of the third resistor is electrically connected to the second terminal of the second resistor, and the second terminal of the third resistor is connected to ground;
 a control circuit for receiving the activating signal; and
 a dummy load system electrically connected to the control circuit,
 wherein the control circuit generates a turn-on signal in response to receiving the activating signal to control the dummy load system.

2. The control system according to claim 1, wherein the dummy load system comprises a switch circuit and a dummy load connected in series, and wherein the control circuit receives the activating signal to continuously output a turn-on signal for a predetermined time, and the switch circuit receives the turn-on signal to turn on the dummy load.

3. The control system according to claim 2, wherein the switch circuit comprises a switch element, and the switch element is selected from the group consisting of a bipolar junction transistor, a metal-oxide-semiconductor field-effect transistor, and an insulated gate bipolar transistor.

4. The control system according to claim 1, further comprising a converter, the converter comprising an input terminal and an output terminal, wherein the converter transforms modulated alternating-current voltage into a direct-current voltage.

5. The control system according to claim 4, wherein the converter comprises:
   a rectifier for rectifying the modulated alternating-current voltage to generate the direct-current voltage; and
   a filter for filtering the direct-current voltage.

6. The control system according to claim 4, wherein the detection circuit comprises a differentiation circuit, and the differentiation circuit is connected to the input terminal or the output terminal of the converter.

7. The control system according to claim 1, wherein the control circuit comprises:
   a fourth resistor comprising a first terminal and a second terminal, wherein the first terminal of the fourth resistor receives a power source;
   a transistor comprising a control terminal, a first terminal, and a second terminal, wherein the control terminal of the transistor is electrically connected to the first terminal of the third resistor of the detection circuit, the first terminal of the transistor is electrically connected to the second terminal of the fourth resistor, and the second terminal of the transistor is connected to ground;
   a timer is electrically connected to the first terminal of the transistor;
   a fifth resistor comprising a first terminal and a second terminal, wherein the first terminal of the fifth resistor is electrically connected to the timer; and
   a sixth resistor comprising a first terminal and a second terminal, wherein the first terminal of the sixth resistor and the second terminal of the fifth resistor are electrically connected to a first node, the first node is electrically connected to the switch circuit, and the second terminal of the sixth resistor s connected to ground.

8. The control system according to claim 1, wherein the control circuit comprises:
   a digital controller comprising an analog digital pin and a first pin, wherein the analog digital pin of the digital controller is electrically connected to the first terminal of the third resistor of the detection circuit;
   a fifth resistor comprising a first terminal and a second terminal, wherein the first terminal of the fifth resistor is electrically connected to the first pin of the digital controller; and
   a sixth resistor comprising a first terminal and a second terminal, wherein the first terminal of the sixth resistor and the second terminal of the fifth resistor are electrically connected to a first node, the first node is electrically connected to the switch circuit, and the second terminal of the sixth resistor is connected to ground.

9. A phase dimmer system, comprising:
   a phase dimmer for modulating a phase of an alternating-current voltage to generate a modulated alternating-current voltage;
   a converter for transforming the modulated alternating-current voltage into a direct-current voltage; and
   a control system, comprising:
      a detection circuit for detecting a level switch of the direct-current voltage, the detection circuit outputting an activating signal when the detection circuit detects the level switch of the direct-current voltage, wherein the detection circuit comprises:
         a capacitor comprising a first terminal and a second terminal, wherein the first terminal of the capacitor receives the direct-current voltage;
         a first resistor comprising a first terminal and a second terminal, wherein the first terminal of the first resistor is electrically connected to the second terminal of the capacitor, and the second terminal of the first resistor is connected to ground:
         a second resistor comprising a first terminal and a second terminal, wherein the first terminal of the second resistor is electrically connected to the second terminal of the capacitor; and
         a third resistor comprising a first terminal and a second terminal, wherein the first terminal of the third resistor is electrically connected to the second terminal of the second resistor, and the second terminal of the third resistor is connected to ground;
      a control circuit for receiving the activating signal to output a turn-on signal;
      a dummy load system electrically connected to the converter in parallel, the dummy load system comprising:
         a switch circuit; and
            a dummy load the switch circuit electrically connected with the dummy load in series, the switch circuit receiving the turn-on signal to turn on the dummy load.

10. The phase dimmer system according to claim 9, wherein the control circuit continuously outputs the turn-on signal for a predetermined time.

11. The phase dimmer system according to claim 10, wherein the phase dimmer is a forward phase dimmer, wherein the detection circuit outputs the activating signal when the detection circuit detects the rising edge of the direct-current voltage.

12. The phase dimmer system according to claim 10, wherein the phase dimmer is a forward phase dimmer or a reverse phase dimmer.

13. The phase dimmer system according to claim 10, wherein the phase dimmer is a triode for alternating current switch or a diode for alternating current switch.

14. The phase dimmer system according to claim 10, wherein the converter comprises:
   a rectifier for rectifying the modulated alternating-current voltage to generate the direct-current voltage; and
   a filter for filtering the direct-current voltage.

15. The phase dimmer system according to claim 10, wherein the detection circuit comprises a differentiation circuit.

16. The phase dimmer system according to claim 10, wherein the switch circuit comprises a switch element, and the switch element is selected from the group consisting of a bipolar junction transistor, a metal-oxide-semiconductor field-effect transistor, and an insulated gate bipolar transistor.

17. The phase dimmer system according to claim 9, wherein the control circuit stops outputting the turn-on signal when the amplitude of the activating signal outputted by the detection circuit is less than a predetermined value.

18. The phase dimmer system according to claim 9, wherein the control circuit comprises:

a fourth resistor comprising a first terminal and a second terminal, wherein the first terminal of the fourth resistor receives a power source;

a transistor comprising a control terminal, a first terminal, and a second terminal, wherein the control terminal of the transistor is electrically connected to the first terminal of the third resistor of the detection circuit, the first terminal of the transistor is electrically connected to the second terminal of the fourth resistor, and the second terminal of the transistor is connected to ground;

a timer electrically connected to the first terminal of the transistor;

a fifth resistor comprising a first terminal and a second terminal, wherein the first terminal of the fifth resistor is electrically connected to the timer; and a sixth resistor comprising a first terminal and a second terminal, wherein the first terminal of the sixth resistor and the second terminal of the fifth resistor are electrically connected to a first node, the first node is electrically connected to the switch circuit, and the second terminal of the sixth resistor is connected to ground.

19. The phase dimmer system according to claim 9, wherein the control circuit comprises:

a digital controller comprising an analog digital pin and a first pin, wherein the analog digital pin of the digital controller is electrically connected to the first terminal of the third resistor of the detection circuit;

a fifth resistor comprising a first terminal and a second terminal, wherein the first terminal of the fifth resistor is electrically connected to the first pin of the digital controller; and a sixth resistor comprising a first terminal and a second terminal, wherein the first terminal of the sixth resistor and the second terminal of the fifth resistor are electrically connected to a first node, the first node is electrically connected to the switch circuit, and the second terminal of the sixth resistor s connected to ground.

20. A method for controlling a phase dimmer system, the phase dimmer system comprising a dummy load system, and the method for controlling the phase dimmer system comprising:

detecting a level switch of a direct-current voltage by the detection circuit of claim 1;

outputting an activating signal when the level switch of the direct-current voltage is detected;

outputting a turn-on signal in response to receiving the activating signal; and controlling the dummy load system according to the turn-on signal.

21. The method according to claim 20, further comprising:

modulating a phase of an alternating-current voltage to generate a modulated alternating-current voltage; and transforming the modulated alternating-current voltage into the direct-current voltage.

22. The method according to claim 20, wherein the turn-on signal is continuously outputted for a predetermined time.

23. The method according to claim 20, further comprising:

detecting the amplitude of the activating signal; and stopping outputting the turn-on signal when the amplitude of the activating signal is less than a predetermined value.

* * * * *